US010309571B2

(12) United States Patent
Yamamoto et al.

(10) Patent No.: US 10,309,571 B2
(45) Date of Patent: Jun. 4, 2019

(54) PIPE STRUCTURE AND AIRCRAFT

(71) Applicant: MITSUBISHI AIRCRAFT CORPORATION, Aichi (JP)

(72) Inventors: Hiroyuki Yamamoto, Tokyo (JP); Tadahiko Suzuta, Tokyo (JP); Kei Takao, Aichi (JP); Ichiro Maeda, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 274 days.

(21) Appl. No.: 14/979,924

(22) Filed: Dec. 28, 2015

(65) Prior Publication Data

US 2016/0238179 A1 Aug. 18, 2016

(30) Foreign Application Priority Data

Feb. 18, 2015 (JP) ................. 2015-029570

(51) Int. Cl.
*F16L 55/07* (2006.01)
*F17D 5/02* (2006.01)
*G01M 3/00* (2006.01)

(52) U.S. Cl.
CPC ............ *F16L 55/07* (2013.01); *F17D 5/02* (2013.01); *G01M 3/002* (2013.01); *F16L 2201/30* (2013.01)

(58) Field of Classification Search
CPC .......... G01M 3/002; G01M 3/18; G01M 3/22; F16L 55/168; F16L 23/04; F16L 55/07
See application file for complete search history.

(56) References Cited

U.S. PATENT DOCUMENTS

| 7,921,694 | B2 * | 4/2011 | Buhring | G01M 3/40 |
| | | | | 73/40 |
| 2012/0018014 | A1 * | 1/2012 | Fernandes | F16L 23/006 |
| | | | | 137/561 A |
| 2012/0247597 | A1 | 10/2012 | Millet et al. | |
| 2016/0238180 | A1 * | 8/2016 | Yamamoto | F17D 5/02 |

FOREIGN PATENT DOCUMENTS

| JP | H0942748 A | 2/1997 |
| JP | 2009-511884 A | 3/2009 |
| WO | 2007/042277 A1 | 4/2007 |

OTHER PUBLICATIONS

Office action for Japanese application No. 2015-029570 dated Oct. 23, 2018.

* cited by examiner

*Primary Examiner* — David Z Huang
(74) *Attorney, Agent, or Firm* — Pearne & Gordon LLP

(57) ABSTRACT

The present invention provides a pipe structure including: a pipe through which a gaseous body having a higher temperature than a temperature of a surrounding atmosphere flows; a cover that covers an outer peripheral portion of the pipe, and defines a plurality of vents from which the gaseous body leaking from the pipe flows out; and a guide member that guides the gaseous body flowing out from the vent toward a line-shaped sensor that passes a position corresponding to each of the plurality of vents, and is sensitive to a temperature or a concentration of a gaseous body outside the cover.

5 Claims, 4 Drawing Sheets

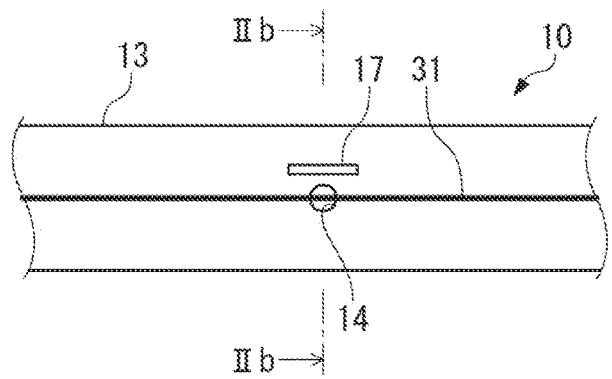
FIG. 2A
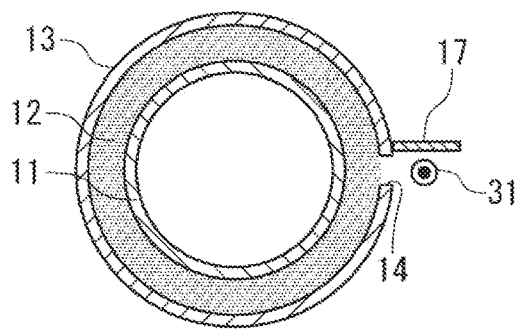
FIG. 2B
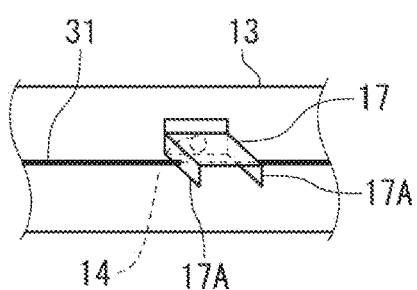
FIG. 2C
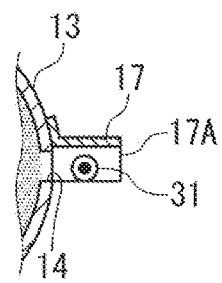
FIG. 2D
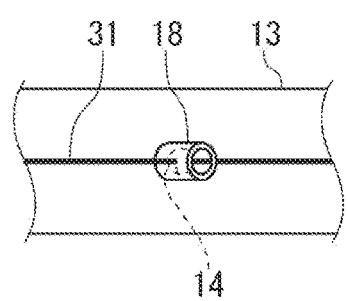
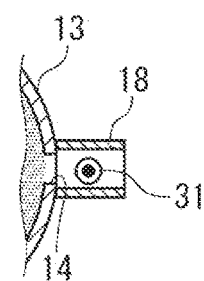
FIG. 2E    FIG. 2F

PIPE STRUCTURE AND AIRCRAFT

BACKGROUND OF THE INVENTION

Field of the Invention

The present invention relates to a pipe structure, and an aircraft including the pipe structure.

Description of the Related Art

An airframe of aircraft is provided with a pipe through which high-temperature bleed air from an engine flows.

For the purpose of weight saving of aircraft, the bleed air pipe is formed to be relatively thin-walled. Thus, there is a possibility that a leak of the bleed air occurs with cracks or corrosion being caused when the bleed air pipe is used over a long period of time.

In order to detect the leak from the bleed air pipe, an arrangement has been proposed which detects a leak by transmitting high-frequency radiation coupled to a bleed air pipe from a transmitting device to cause the high-frequency radiation to propagate along the bleed air pipe, receiving radiation propagating to the outside from a crack or the like of the bleed air pipe, and performing evaluation (JP 2009-511884 A).

In order to detect the leak from the bleed air pipe, a plurality of vent holes from which the leaking bleed air flows out to the outside are formed in a cover that covers the bleed air pipe at intervals in a length direction of the pipe. A line-shaped sensor whose temperature is increased by the bleed air flowing out from the vent holes is provided so as to sequentially pass by the vent holes. The leak can be detected based on electrical resistance of the sensor that is changed when the temperature is increased.

The bleed air pipe and the sensor are arranged in a narrow space that is prepared within a main wing or a fuselage, and are mounted to a peripheral member by a bracket.

Positions of the vent holes from which the high-temperature bleed air flows out during the leak are set by avoiding a position facing a member that is susceptible to heat. However, if a leak with a small flow rate in an initial stage of cracks or corrosion is not detected, and the leak is detected only after the flow rate of the bleed air flowing out from the vent hole is increased with the progress of the cracks or the corrosion, heat generated by the leak of the bleed air affects a larger area.

In accordance with the arrangement for detecting a leak in JP 2009-511884 A, the leak can be quickly detected. However, since the transmitting device/a receiving device of the high-frequency radiation, and an evaluation device are required, a cost of the arrangement is high. Particularly, it is not easy to construct an algorithm for appropriately evaluating the received high-frequency radiation and determining the occurrence of the leak. Thus, the arrangement cost is increased.

Thus, an object of the present invention is to provide a pipe structure that can reliably detect even a leak with a small flow rate corresponding to a defect in an initial stage of a pipe by using a line-shaped sensor without using an expensive device, and an aircraft including the pipe structure.

SUMMARY OF THE INVENTION

A pipe structure of the present invention includes: a pipe through which a gaseous body having a higher temperature than a temperature of a surrounding atmosphere flows; a cover that covers an outer peripheral portion of the pipe, and defines a plurality of vents from which the gaseous body leaking from the pipe flows out; and a guide member that guides the gaseous body flowing out from the vent toward a line-shaped sensor that passes a position corresponding to each of the plurality of vents, and is sensitive to a temperature or a concentration of a gaseous body outside the cover.

A pipe structure of the present invention includes: a pipe through which a gaseous body having a higher temperature than a temperature of a surrounding atmosphere flows; a cover that covers an outer peripheral portion of the pipe, and defines a plurality of vents from which the gaseous body leaking from the pipe flows out; and a wind protection wall that blocks a flow of a gaseous body outside the cover that affects a flow of the gaseous body flowing out from the vents.

The pipe structure of the present invention may further include a line-shaped sensor that passes a position corresponding to each of the plurality of vents, and is sensitive to a temperature or a concentration of the gaseous body outside the cover.

A pipe structure of the present invention includes: a pipe through which a gaseous body having a higher temperature than a temperature of a surrounding atmosphere flows; a cover that covers an outer peripheral portion of the pipe, and defines a plurality of vents from which the gaseous body leaking from the pipe flows out; a line-shaped sensor that passes a position corresponding to each of the plurality of vents, and is sensitive to a temperature of a gaseous body outside the cover; and a heat-transfer member that is interposed between the vents, and transfers heat of the gaseous body flowing out from the vents to the sensor.

The respective pipe structures described above may include a heat insulating material that is interposed between the pipe and the cover.

An aircraft of the present invention includes one of the above pipe structures.

The present invention is suitable for a pipe structure through which bleed air from an engine or an auxiliary power unit that is a power source of the aircraft flows.

In the present invention, a device, such as the wind protection wall, the guide member, and the heat-transfer member, which prevents buoyancy and disturbance elements from affecting the flow flowing out from the vents is provided. Accordingly, it is possible to reliably detect even a leak with a small flow rate corresponding to a defect in an initial stage of the pipe while using the line-shaped (wire-shaped) sensor for which it is difficult to capture the flow flowing out from the vents of the cover without using an expensive device that electronically preforms arithmetic operation or analysis.

BRIEF DESCRIPTION OF THE DRAWINGS

FIGS. 1A-1C are views illustrating a basic form of a pipe structure according to a first embodiment in which FIG. 1A is a side view, FIG. 1B is a longitudinal-sectional view taken along a line Ib-Ib in FIG. 1A, and FIG. 1C is a cross-sectional view taken along a line Ic-Ic in FIG. 1A;

FIG. 2A is a side view illustrating a feature portion (a guide member) of the pipe structure according to the first embodiment, FIG. 2B is a cross-sectional view taken along a line IIb-IIb in FIG. 2A, FIGS. 2C and 2D are views illustrating a modification of the first embodiment, and FIGS. 2E and 2F are views illustrating another modification of the first embodiment;

DETAILED DESCRIPTION OF THE PREFERRED EMBODIMENTS

In the following, embodiments of the present invention will be described by reference to the accompanying drawings.

[First Embodiment]

Figure 1A:
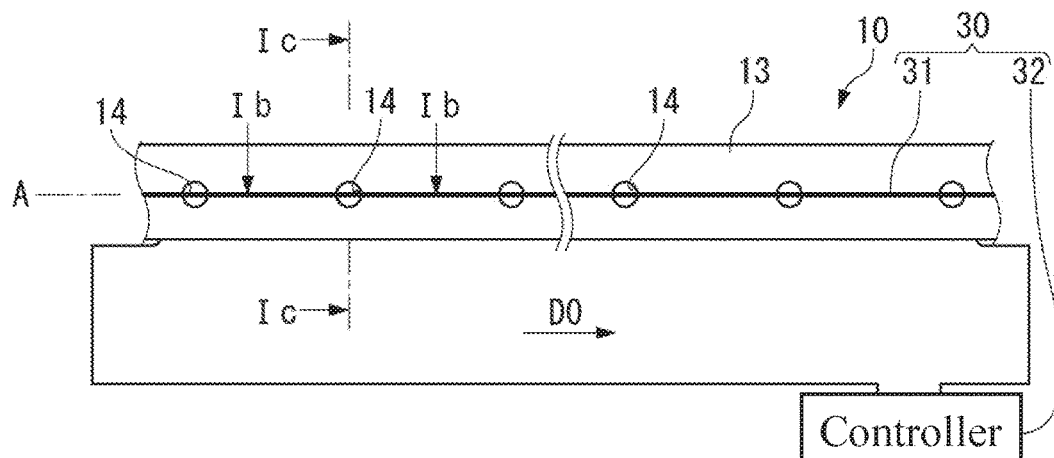

A pipe structure 10 shown in FIG. 1A supplies bleed air from an engine of an aircraft to an air conditioner, an anti-icing device, or the like.

The pipe structure 10 is disposed in a space prepared within a main wing or a fuselage of the aircraft, and is supported by a structural member constituting the main wing or the fuselage.

In the present specification, an "upper side" means an upper side in a vertical direction, and a "lower side" means a lower side in the vertical direction.

Also, in the present specification, a "horizontal direction" means a horizontal direction of the aircraft in a state in which the aircraft is parked on the ground.

The pipe structure 10 of a present embodiment is also applied to a structure that supplies bleed air from an auxiliary power unit that is provided at a rear end of the fuselage, to the air conditioner, the anti-icing device, or the like.

Figure 1B:
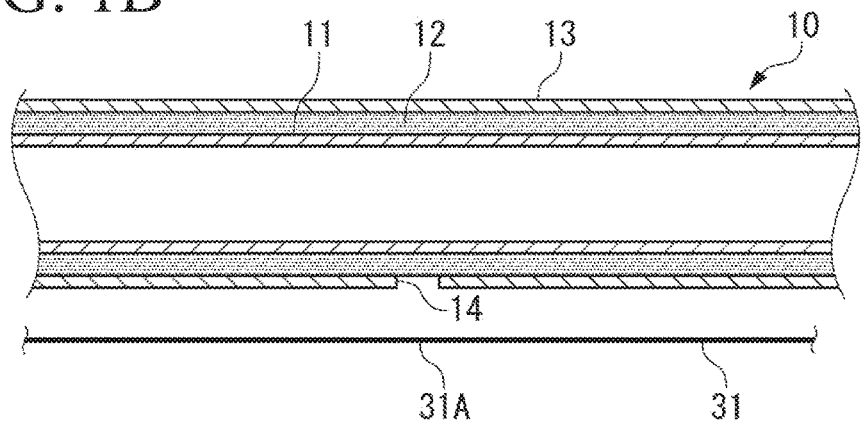

As shown in FIGS. 1A and 1B, the pipe structure 10 includes a pipe 11 through which the bleed air flows, a heat insulating material 12 and a cover 13 that cover an outer peripheral portion of the pipe 11, and a leak sensor 30 (a leak detector) that detects a leak of the bleed air from the pipe 11.

The leak sensor 30 has a line-shaped sensor 31 corresponding to a temperature sensor that is sensitive to a temperature, and a controller 32 that detects the leak based on electrical resistance of the sensor 31 (FIG. 1A).

The pipe 11 is formed of a metal material such as stainless steel. The pipe 11 may be divided into a plurality of pipes. The pipes are connected together by coupling.

Figure 1C:
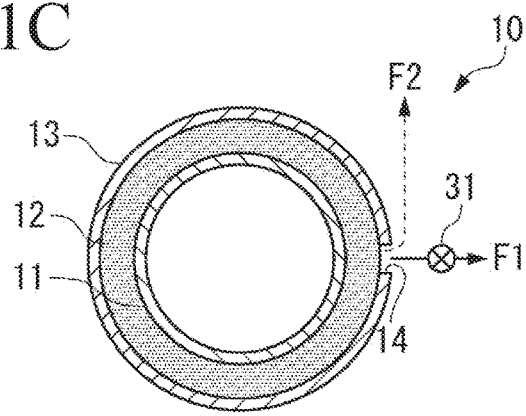

The high-temperature bleed air extracted from the engine continuously flows through the pipe 11. In order to keep the pipe 11 warm, and retain heat of the bleed air within the pipe 11, the outer peripheral portion of the pipe 11 is surrounded by the heat insulating material 12 (FIGS. 1B and 1C).

The heat insulating material 12 has breathability. As the heat insulating material 12, various materials such as glass wool and urethane foam can be used.

The cover 13 covers the outer peripheral portion of the heat insulating material 12, and defines a leak-detecting vent hole 14 from which the bleed air leaking from the pipe 11 flows out.

For example, a cover formed of a composite material such as CFRP (carbon fiber reinforced plastics) can be used as the cover 13, as the cover 13 covers the outer peripheral portion of the heat insulating material 12. When the cover 13 is formed in a ring shape in section, the cover 13 is easily fitted to the pipe 11. The pipe 11 and the cover 13 are disposed in a concentric manner.

As the vent hole 14, a plurality of vent holes are formed at intervals in a length direction of the cover 13 (a direction of an axis line A of the pipe 11) as shown in FIG. 1A. The respective vent holes 14 pass through the cover 13 in a thickness direction. Although the vent holes 14 are formed in a circular shape, the vent holes 14 may have another shape.

Each of the vent holes 14 is formed at one position on a circumference of the cover 13 (FIG. 1C).

The bleed air leaking from a defective portion such as cracks and corrosion generated at any position in the length direction and at any position in a circumferential direction in the pipe 11 reaches the vent hole 14 close to the defective portion through the heat insulating material 12 positioned between the outer peripheral portion of the pipe 11 and an inner peripheral portion of the cover 13, and flows out toward the line-shaped sensor 31 disposed outside the cover 13 via the vent hole 14. When a temperature of a portion 31A of the sensor 31 facing the vent hole 14 is increased by the bleed air, the electrical resistance of the sensor 31 is changed. Thus, the leak can be detected based on the change.

The leak sensor 30 (FIG. 1A) detects the leak of the bleed air collectively over an entire length of the pipe 11 based on the electrical resistance of the line-shaped sensor 31 that sequentially passes by the respective vent holes 14.

A width (a diameter) of the sensor 31 is smaller than a hole diameter of the vent holes 14, and for example, is several mm.

An element whose electrical characteristics are changed to cause a change in electrical resistance when a temperature of the element is increased can be appropriately used as the sensor 31.

The sensor 31 is arranged along the cover 13 so as to pass positions corresponding to the respective vent holes 14. The sensor 31 is supported at an interval from a surface of the cover 13 by brackets (not shown) that are disposed at appropriate intervals in the length direction. The brackets are fixed to structural members of an airframe or accessories. The interval between the sensor 31 and the cover 13 is, for example, several mm to several tens mm.

Members such as the structural members of the airframe and the accessories exist around the pipe structure 10. The vent holes 14 from which the high-temperature bleed air flows out during the leak are set at positions in the length direction of the cover 13 and at positions in the circumferential direction by avoiding a position facing a member that is susceptible to heat.

For example, a member formed of a composite material (a fiber reinforced resin) or aluminum alloy falls under the member that is susceptible to heat.

Here, the circumferential position of each of the vent holes 14 means a direction of the vent hole 14, that is, an angle (rotation) formed between a hole axis of the vent hole 14 and a reference position of the cover 13 (for example, a twelve o'clock position at an upper end). In the present specification, the angle of the vent hole 14 is sometimes represented by "time" by assuming a cross sectional surface of the cover 13 to be a face of a clock.

When the vent hole 14 is positioned in the vicinity of, for example, a three o'clock position or a nine o'clock position, the bracket for mounting the sensor 31 facing the vent hole 14 is easily mounted to a spar, a stringer, or the like that exists on a lateral side in a pipe installation space. However, members susceptible to heat are scattered in the small pipe installation space. Thus, it is often not possible to ensure a place for mounting the bracket in the vicinity of the three o'clock position or the nine o'clock position. Therefore, the circumferential position (the angle, the rotation) of the vent hole 14 is not fixed.

When the vent hole 14 and the sensor 31 facing the vent hole 14 are sufficiently close to each other, a flow of the bleed air flowing out from the vent hole 14 (a leak flow) almost reliably reaches the sensor 31. However, depending on a mounting position of a clamp that supports the sensor 31, the vent hole 14 and the sensor 31 are away from each other. Thus, there is a possibility that the leak flow flowing out from the vent hole 14 deviates from the sensor 31, and the temperature of the sensor 31 is not increased to a temperature necessary for detection. A main cause thereof is buoyancy acting on the leak flow.

When the leak flow flowing out along the hole axis from the vent hole 14 has a large flow rate, the leak flow directly travels along the hole axis direction as indicated by a solid arrow F1 in FIG. 1C. On the other hand, when the leak flow has a small flow rate, the buoyancy overcomes a pressure of the leak flow, and the leak flow is lifted up with respect to a surrounding gaseous body as indicated by a dashed arrow F2 in FIG. 1C. Thus, in a case in which the sensor 31 is wired along the length direction of the cover 13 at a position corresponding to the vent hole 14 and the leak flow has a small flow rate, the high-temperature gaseous body may not reach the sensor 31. In such a case, no leak is detected.

A direction of wiring of the sensor 31 may be devised in consideration of the buoyancy acting on the bleed air flowing out from the vent hole 14. However, in consideration of a wiring length and workability, it is desirable that the sensor 31 is wired as linearly as possible along the length direction of the cover 13.

Disturbance such as movement of a gaseous body around the sensor 31 and fluctuations in temperature/pressure as well as the buoyancy also becomes a cause of the problem that the leak flow deviates from the sensor 31 and no leak is detected.

Therefore, in order to solve the problem that the leak flow deviates from the sensor 31 due to the buoyancy or the disturbance while linearly wiring the sensor 31 according to a typical method, the pipe structure 10 of the present embodiment includes a guide member 17 that guides the leak flow flowing out from the vent hole 14 to the sensor 31.

Although the sensor 31 can be wired in any manner in the present embodiment, the sensor 31 is wired along the length direction of the cover 13 at a predetermined interval from the surface of the cover 13 in an example shown in FIGS. 2A and 2B.

The guide member 17 is formed in a plate shape, projects from the surface of the cover 13, and is horizontally disposed above the vent hole 14 as shown in FIGS. 2A and 2B.

The guide member 17 mainly corresponds to the leak flow that is lifted up by the influence of the buoyancy. The guide member 17 preferably projects at least to the position of the sensor 31 from the surface of the cover 13 such that the leak flow reliably reaches the sensor 31 without deviating. The guide member 17 of the present embodiment projects to the position exceeding the sensor 31 that traverses the vent hole 14.

The lifting of the leak flow flowing out from the vent hole 14 is restricted by the guide member 17, so that the leak flow reaches the sensor 31 that is positioned below the guide member 17. When the temperature of the sensor 31 is thereby increased, the electrical resistance of the sensor 31 is changed. The controller 32 (FIG. 1A) of the leak sensor 30 determines whether the temperature of the sensor 31 reaches a set temperature based on the electrical resistance of the sensor 31. When determining that the temperature reaches the set temperature, the controller 32 detects the leak.

In accordance with the present embodiment, not only the leak flow F1 (the solid line in FIG. 1C) having a large flow rate, but the leak flow F2 (the dashed line in FIG. 1C) having a small flow rate can be also caused to reach the sensor 31. Therefore, it is possible to reliably detect the leak flow having a small flow rate that is easily affected by the buoyancy.

The guide member 17 may be also formed such that an outer periphery 17A along the hole axis direction of the vent hole 14 projects downward as shown in FIGS. 2C and 2D. Accordingly, the outer periphery 17A can guide the leak flow flowing to a lower side of the guide member 17 toward the sensor 31 without letting the leak flow escape from the lower side of the guide member 17.

Moreover, a guide tube 18 formed in a tubular shape may be used as shown in FIGS. 2E and 2F.

The guide tube 18 surrounds the vent hole 14, and projects from the surface of the cover 13. The sensor 31 is wired so as to pass through a wall of the guide tube 18 in a thickness direction.

The leak flow flowing out from the vent hole 14 is guided to the sensor 31 along an axial direction of the guide tube 18 while the lifting of the leak flow is restricted by the wall of the guide tube 18.

When the guide tube 18 is used, it is possible to avoid the deviation of the leak flow from the sensor 31 due to disturbance such as movement of a surrounding gaseous body in addition to the influence of the buoyancy.

An inner diameter of the guide tube 18 can be appropriately set in consideration of a pressure loss of the leak flow. Although the inner diameter is set to be slightly larger than the hole diameter of the vent hole 14 in an example shown in FIGS. 2E and 2F, the inner diameter may be also set to be equal to the hole diameter of the vent hole 14.

The present embodiment can be applied to any of the plurality of vent holes 14 formed in the cover 13 regardless of the position (the angle, the rotation) of the vent hole 14.

The direction in which the guide member 17 and the guide tube 18 project from the surface of the cover 13 is not limited to the direction along the hole axis of the vent hole 14. The guide member 17 and the guide tube 18 may project in a direction inclined with respect to the hole axis.

The pipe structure 10 of the present embodiment can be applied not only to a section in which the pipe 11 is installed along a horizontal direction D0, but also to a section in which the pipe 11 is installed so as to be inclined with respect to the horizontal direction D0, or the pipe 11 is disposed along the vertical direction. That is, the pipe 11 may have any posture. The same applies to second and third embodiments.

When the guide member 17 or the guide tube 18 is disposed, the posture of the pipe 11, and the influences of the buoyancy and the disturbance on the leak flow flowing out from the vent hole 14 positioned at a predetermined position (rotation) in the circumferential direction of the cover 13 in the pipe 11 may be considered. The guide member 17 is preferably disposed above the vent hole 14 that requires the guide member 17 out of the plurality of vent holes 14. Even when the pipe 11 is inclined with respect to the horizontal direction D0, the guide member 17 can be horizontally installed.

In accordance with the present embodiment, the leak flow having a small flow rate also reaches the sensor 31. It is thus possible to reliably detect the leak caused by a defective portion, such as cracks and corrosion that has not been progressed yet by the leak sensor 30. By appropriately performing repair and replacement of the pipe 11 based on detection results by the leak sensor 30, reliability of a system including the pipe structure 10 and safety of the aircraft can be improved.

In the present embodiment, the sensor 31 can be arranged in any manner.

In order to ensure redundancy for disconnection or the like of the sensor 31 and also improve detection sensitivity of the sensor 31, it is preferable to duplicate the sensor 31 by using the two sensors 31. At this time, the two sensors 31 may be wired parallel to each other, or may cross each other.

[Second Embodiment]

Next, the second embodiment of the present invention will be described by reference to FIGS. 3A-3D.

In the following embodiment, points different from those of the first embodiment will be mainly described. The same constituent elements as those of the first embodiment are assigned the same reference numerals.

The pipe structure according to the second embodiment includes a wind protection wall 15 (FIGS. 3A and 3B) that blocks wind against the leak flow flowing out from the vent hole 14 in order to avoid a decrease in the leak detection sensitivity due to wind around the pipe structure.

For example, the wind around the pipe structure is generated by ventilation of the pipe installation space, or movement of a gaseous body due to a temperature gradient or a pressure gradient in the space. The wind flows in a direction crossing the hole axis direction of the vent hole 14 that defines an original direction of the leak flow.

In order to prevent the leak flow particularly having a small flow rate from deviating from the sensor 31 according to the wind direction, the wind protection wall 15 projects from the surface of the cover 13 where the vent hole 14 is formed.

Figure 3A:
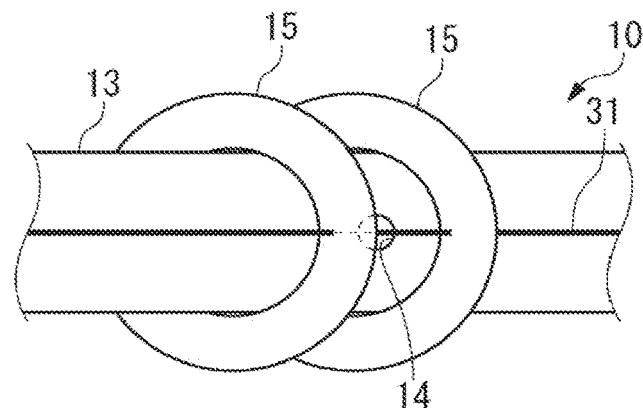
FIG. 3A is a perspective view illustrating a pipe structure according to a second embodiment.
Figure 3B:
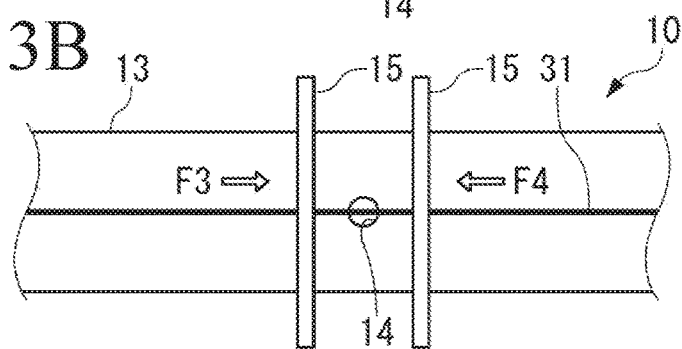
FIG. 3B is a side view of the pipe structure shown in FIG. 3A.

Although the sensor 31 can be wired in any manner in the present embodiment, the sensor 31 is wired along the length direction of the cover 13 at a predetermined interval from the surface of the cover 13 in an example shown in FIGS. 3A and 3B. The sensor 31 passes through the wind protection wall 15.

Figure 3C:
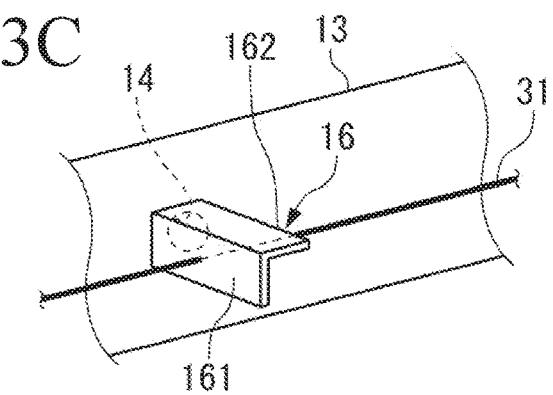
FIG. 3C is a view illustrating a modification of a wind protection wall.
Figure 3D:
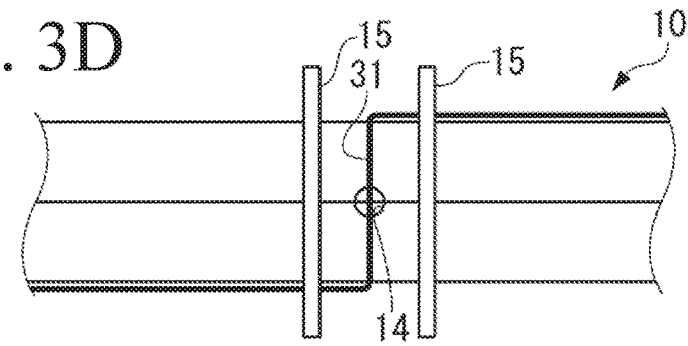
FIG. 3D is a view illustrating a wiring example of a sensor.

The sensor 31 may be also wired so as to rise upward from the position corresponding to the vent hole 14 between the wind protection walls 15 and 15 as shown in FIG. 3D.

In the present embodiment, the wind protection wall 15 is formed in an annular shape, and is fitted to the cover 13 so as to surround the outer peripheral portion of the cover 13. The wind protection wall 15 is disposed on opposite sides of the vent hole 14 in the length direction of the cover 13. The wind protection walls 15 can block both of wind F3 directed to the vent hole 14 from a left side, and wind F4 directed to the vent hole 14 from a right side in FIG. 3B.

In accordance with the present embodiment, the leak flow having a small flow rate can be also caused to reach the sensor 31 by blocking the wind F3 and the wind F4 around the pipe structure by the wind protection walls 15. It is thus possible to reliably detect the leak occurring in the pipe 11 regardless of the flow rate.

The wind protection walls 15 preferably project at least to a position of the sensor 31 from the surface of the cover 13 such that the leak flow reliably reaches the sensor 31 without deviating. The wind protection walls 15 of the present embodiment project to a position exceeding the sensor 31 that traverses the vent hole 14.

The wind protection walls 15 only need to be provided at the vent hole 14 and in its vicinity in order to block the wind against the leak flow. A portion not required for blocking the wind against the leak flow may be removed by, for example, forming the wind protection walls 15 in a C shape.

Also, the wind protection walls 15 only need to be provided at a necessary position according to the direction of the wind to be blocked that affects the leak flow. The wind protection wall 15 may be provided only on one side of the vent hole 14.

When the wind flows upward or downward along the vertical direction of the cover 13, a wind protection wall that is positioned above or below the vent hole 14 can be provided. For example, a wind protection wall 16 including a side wall 161 and an upper wall 162 can be formed as shown in FIG. 3C.

The wind protection wall 16 may be provided on the cover 13 or on the sensor 31.

A configuration shown in FIG. 3C also contributes to causing the leak flow having a small flow rate under the influence of the buoyancy to reach the sensor 31 since the lifting of the leak flow flowing out from the vent hole 14 is restricted by the upper wall 162.

Also, when the pipe structure 10 is installed so as to be inclined with respect to the horizontal direction or installed along the vertical direction, the wind protection walls 15 also contribute to restricting the lifting of the leak flow flowing out from the vent hole 14 and causing the leak flow having a small flow rate under the influence of the buoyancy to reach the sensor 31.

The second embodiment can be applied to any of the plurality of vent holes 14 formed in the cover 13 regardless of the position (the angle, the rotation) of the vent hole 14.

[Third Embodiment]

Next, the third embodiment of the present invention will be described by reference to FIGS. 4A, 4B.

Figure 4A:
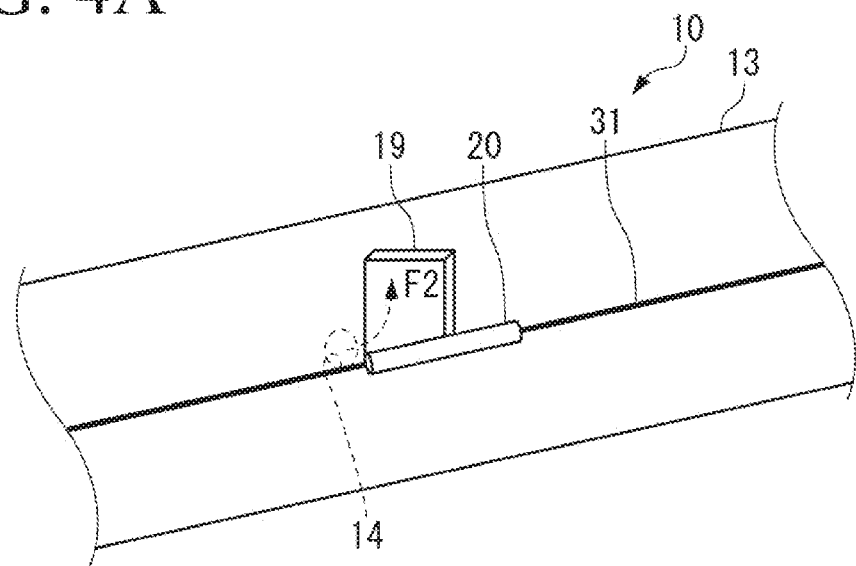
FIG. 4A is a perspective view illustrating a pipe structure according to a third embodiment.
Figure 4B:
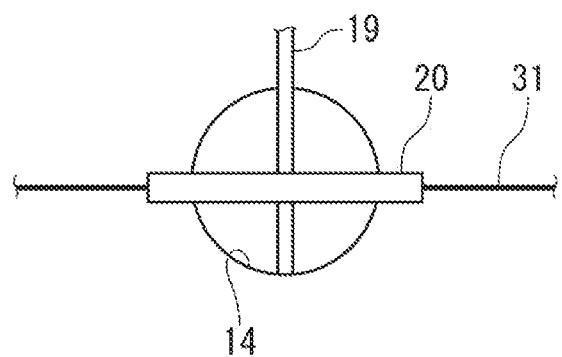
FIG. 4B is a view illustrating a heat-transfer member from a front surface of a vent hole.

In the third embodiment, a heat-transfer member 19 that transfers heat of the leak flow flowing out from the vent hole 14 to the sensor 31 is disposed between the vent hole 14 and the sensor 31 as shown in FIGS. 4A and 4B.

The heat-transfer member 19 is a good conductor of heat that is formed of an appropriate material.

The heat-transfer member 19 is disposed immediately close to the vent hole 14. The heat-transfer member 19 is interposed between the vent hole 14 and the sensor 31 that is wired at a predetermined interval from the surface of the cover 13. The heat-transfer member 19 is also disposed along a route where the leak flow having a small flow rate from the vent hole 14 is lifted up such that the heat-transfer member 19 sufficiently comes into contact with the leak flow.

The heat-transfer member 19 of the present embodiment is formed in a plate shape having a smaller thickness than the hole diameter of the vent hole 14 as shown in FIG. 4B. The heat-transfer member 19 is disposed so as to be erected with respect to an outer peripheral surface of the cover 13.

The heat-transfer member 19 and the sensor 31 are thermally coupled together via a sheath 20 that covers an outer peripheral portion of the sensor 31 at the position corresponding to the vent hole 14. The heat-transfer member 19 and the sensor 31 may be directly thermally coupled together without using the sheath 20.

When being affected by the buoyancy, the leak flow flowing out from the vent hole 14 is lifted up along front and back plate surfaces of the heat-transfer member 19 from a lower end portion of the heat-transfer member 19 that is positioned in front of the vent hole 14 as indicated by a dashed arrow (F2) in FIG. 4A. At this time, the heat of the leak flow is transferred to the sensor 31 through the heat-transfer member 19, so that the temperature of the sensor 31 is increased.

In a case in which the leak flow has a flow rate large enough to escape from the influence of the buoyancy, the leak flow jetted along the hole axis of the vent hole 14 directly reaches the sensor 31, or the heat of the leak flow is transferred to the sensor 31 through the heat-transfer member 19, or both of the above situations arise. Accordingly, the temperature of the sensor 31 is increased.

Accordingly, in accordance with the present embodiment, it is also possible to reliably detect the leak occurring in the pipe 11, including the leak with a small flow rate corresponding to cracks, corrosion or the like in an initial stage of the pipe 11 similarly to the respective embodiments described above.

The third embodiment can be applied to any of the plurality of vent holes 14 formed in the cover 13 regardless of the position (the angle, the rotation) of the vent hole 14.

The heat-transfer member 19 can be disposed over an appropriate range in consideration of a direction of the leak flow flowing out from the vent hole 14, and disturbance elements affecting the leak flow.

Two or more embodiments appropriately selected from the first to third embodiments described above may be combined together.

The constitutions described in the aforementioned embodiments may be also freely selected or appropriately changed into other constitutions without departing from the scope of the present invention.

It is not essential that the heat insulating material 12 is interposed between the pipe 11 and the cover 13. Even when the outer peripheral portion of the pipe 11 is directly covered by the cover 13, the devices (the wind protection wall, the guide member, and the heat-transfer member) used for the pipe structure described in the first to third embodiments can be applied.

The pipe structure of the present invention is not limited to the structure through which the bleed air from the engine or the auxiliary power unit flows. The present invention can be also applied to a pipe structure through which another high-temperature gas flows.

Also, the present invention is not limited to the aircraft, and can be applied to a pipe structure provided in various industrial plants.

Furthermore, the sensitive section used for the leak detection is not limited to the temperature sensor that is sensitive to a temperature of a gaseous body in a space to which the gaseous body leaks, and a concentration sensor that is sensitive to a concentration of a gaseous body may be also employed.

What is claimed is:

1. A pipe structure comprising:
    a pipe through which a gaseous body having a higher temperature than a temperature of a surrounding atmosphere flows;
    a cover that covers an outer peripheral portion of the pipe, and defines a plurality of vents from which the gaseous body leaking from the pipe flows out; and
    a heat-transfer member that is interposed between a line-shaped sensor that passes a position corresponding to each of the plurality of vents, and is sensitive to a temperature of a gaseous body outside the cover, and one of the plurality of vents, and transfers heat of the gaseous body flowing out from said one of the plurality of vents to the sensor, and the heat-transfer member has a smaller thickness than a diameter of said one of the plurality of vents.

2. The pipe structure according to claim 1, further comprising a heat insulating material that is interposed between the pipe and the cover.

3. The pipe structure according to claim 1, wherein the heat-transfer member is formed in a plate shape.

4. An aircraft comprising the pipe structure according to claim 1.

5. The aircraft according to claim 4, wherein the gaseous body flowing through the pipe is bleed air from an engine or an auxiliary power unit that is a power source of the aircraft.

* * * * *